United States Patent Office 2,720,542
Patented Oct. 11, 1955

2,720,542

1-HYDROXY-4-METHOXY-7-KETO-13-METHYL-5,6,7,9,10,13-HEXAHYDROPHENANTHRENE AND PROCESSES OF PREPARING THE SAME

William F. Newhall, Winter Haven, Fla., assignor to Merck & Co., Inc., Rahway, N. J., a corporation of New Jersey No Drawing. Application August 24, 1954, Serial No. 451,957

4 Claims. (Cl. 260—590)

This invention is concerned generally with novel compounds valuable as intermediates in the total synthesis of steriods, and potentially useful in the synthetic preparation of steroid hormones such as 11-dehydro-17-hydroxy-corticosterone, commonly known as cortisone. More particularly, this invention relates to the novel compound 1 - hydroxy - 4 - methoxy - 7 - keto - 13 - methyl - 5,6,7,9,10,13-hexahydrophenanthrene, to the process of preparing this compound, and to the novel intermediate compounds utilized in this process. This 1-hydroxyl-4-methoxy - 7 - keto - 13 - methyl - 5,6,7,9,10,13 - hexahydrophenanthrene is of value as an intermediate in the total synthesis of steroids and, alternatively, is useful as an intermediate in the synthesis of compounds useful as antitussives.

This application is a continuation-in-part of my co-pending application Serial No. 193,291, filed October 31, 1950, now abandoned.

The compound 1-hydroxy-4-methoxy-7-keto-13-methyl-5,6,7,9,10,13-hexahydrophenanthrene can be represented by the following structural formula:

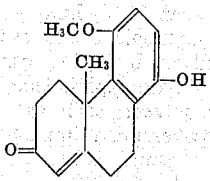

I have discovered that this compound can be prepared according to a novel synthetic procedure which is conducted as follows: hydroquinone dimethyl ether (compound 1 on the following page) is reacted with succinic anhydride in the presence of aluminum chloride to produce β-(2-hydroxy-5-methoxy-benzoyl)-propionic acid (compound 2), which compound is then reduced to form gamma-(2-hydroxy-5-methoxy-phenyl)-butyric acid (compound 3). The latter compound is heated with an aqueous solution of mineral acid thereby forming 5-hydroxy-8-methoxy-tetralone-1 (compound 4), which is then reacted with methyl magnesium iodide to produce 1-hydroxy-4-methoxy-5-methyl-7,8-dihydronaphthalene (compound 5). This product is reacted with osmium tetroxide in an organic solvent solution and the intermediate osmate ester thus formed is hydrolyzed thereby forming 1,5,6-trihydroxy - 4 - methoxy - 5 - methyl - 5,6,7,8 - tetrahydronaphthalene (compound 6) which is heated with an aqueous mineral acid solution to form 5-hydroxy-8-methoxy-1-methyl-tetralone-2 (compound 7). The 5-hydroxy-8-methoxy-1-methyl-tetralone-2 is then condensed with diethylamino butanone-2-methiodide in the presence of an alkaline condensing agent thereby forming 1 - hydroxy - 4 - methoxy - 7 - keto - 13 - methyl - 5,6,7,9,10,13-hexahydrophenanthrene (compound 8).

These reactions may be chemically represented as follows:

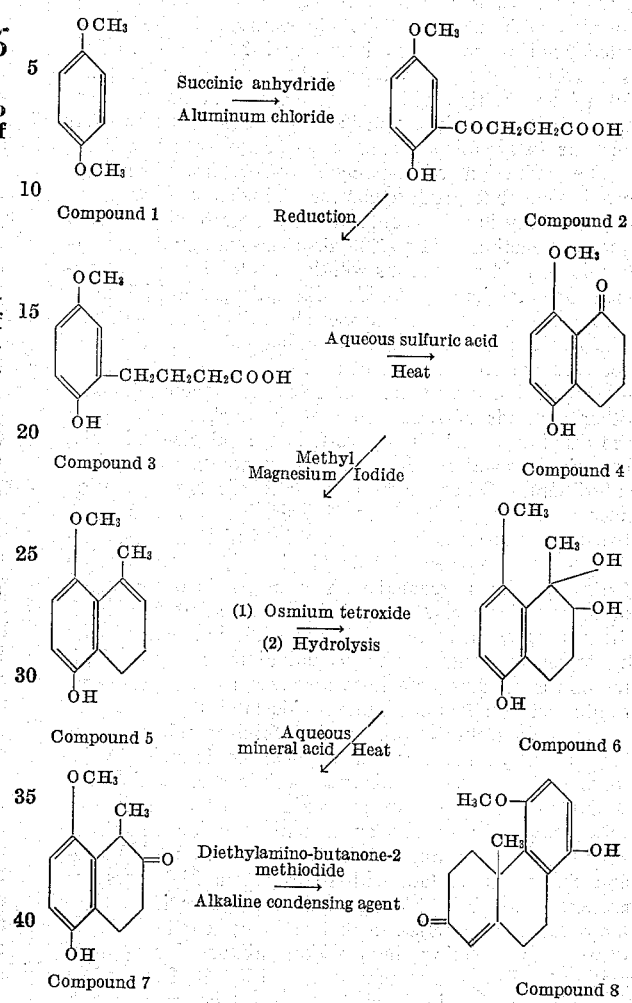

The reaction between the hydroquinone dimethyl ether (compound 1) and the succinic anhydride is carried out by bringing the reactants together in an organic solvent such as nitrobenzene, carbon disulfide, tetrachloroethane, and the like, in the presence of aluminum chloride, and heating the resulting mixture at a temperature within the range of 55–60° C. for a period of approximately 2 to 3 hours. The preferred solvent for this reaction is nitrobenzene. I have found that the temperature and the time of reaction are critical factors in this step. In particular, it is essential to conduct the reaction at a temperature within the range of 55–60° C., since, at higher or lower temperatures, various side reactions occur; for example, at room temperature it has been found that 70% of undemethylated product (β-(2,5-dimethoxy-benzoyl)-propionic acid) is obtained. The time of reaction is likewise critical and should be approximately 3 hours in order to obtain the maximum yield of β-(2-hydroxy-5-methoxy-benzoyl)-propionic acid (compound 2).

The reaction is conveniently carried out by dissolving equimolecular quantities of hydroquinone dimethyl ether and succinic anhydride in nitrobenzene, cooling this mixture to approximately 10° C. and adding approximately 2 molecular equivalents of anhydrous aluminum chloride to this mixture with cooling. During the addition, the temperature should not be allowed to rise above approximately 35° C. After the addition of aluminum chloride is complete, the resulting solution of the reactants is warmed slowly to a temperature between approximately 55 and 60° C. and the solution is maintained at this temperature, with stirring, for about 3 hours. The β-(2-hydroxy-5-methoxy-benzoyl)-propionic acid thus produced is recovered from the dark viscous reaction mixture by pouring said mixture into excess aqueous acid solution with cooling. The nitrobenzene is then separated from the resulting mixture, and the desired product is conveniently recovered from the residue in crystalline form by extraction with an organic solvent such as benzene. It is conveniently purified by recrystallization from an aqueous organic solvent such as aqueous methanol.

The reduction of β-(2-hydroxy-5-methoxy-benzoyl)-propionic acid to produce gamma-(2-hydroxy-5-methoxy-phenyl)-butyric acid (compound 3) is preferably carried out by reacting said β-(2-hydroxy-5-methoxy-benzoyl)-propionic acid in aqueous solution containing one equivalent of potassium hydroxide with hydrogen at high pressure in the presence of a copper chromium oxide catalyst. The hydrogenation reaction is best conducted at a temperature within the range 140–180° C. The foregoing hydrogenation procedure possesses the advantage over other methods of reduction that the carbonyl group of the starting material is converted in good yield directly, in a single reaction step, to the corresponding methylene substituent. Other methods of catalytic hydrogenation may be employed, however, if desired, as for example a two-step hydrogenation reaction in which the β-(2-hydroxy-5-methoxy-benzoyl)-propionic acid in aqueous alkaline solution is reacted with hydrogen in the presence of Raney nickel catalyst and the intermediate product is then dissolved in methanol and the solution reacted with hydrogen in contact with a palladium catalyst. This method is not as satisfactory, however, as the hydrogenation utilizing copper chromium oxide catalyst.

In carrying out my preferred method of reduction, the β-(2-hydroxy-5-methoxy-benzoyl)-propionic acid is dissolved in an aqueous alkaline solution containing one equivalent of potassium hydroxide, approximately 10–15% by weight of copper chromium oxide catalyst is added to the solution, and the resulting mixture is heated and shaken in contact with hydrogen at high pressure, preferably at about 3500 pounds per square inch. The hydrogenation reaction is conveniently carried out by heating and shaking the reaction mixture for approximately 2 hours at a temperature of 160° C., followed by an additional heating period of several hours at a temperature of about 180° C. The gamma-(2-hydroxy-5-methoxy-phenyl)-butyric acid thus formed is recovered from the aqueous reaction mixture by conventional means, as for example by filtering the catalyst, acidifying the filtrate and extracting the gamma-(2-hydroxy-5-methoxy-phenyl)-butyric acid with ether. The product is then recovered from the ether solution by evaporating the ether and is conveniently purified by distillation in vacuo.

The gamma-(2-hydroxy-5-methoxy-phenyl)-butyric acid is then heated with aqueous sulfuric acid thereby producing 5-hydroxy-8-methoxy-tetralone-1 (compound 4). It is ordinarily preferred to utilize 85% sulfuric acid. It has been found that the reaction can be brought to substantial completion by heating the aqueous acidic reaction mixture for a period of about 1 hour at approximately 80–100° C. The 5-hydroxy-8-methoxy-tetralone-1 is conveniently recovered from the reaction solution by diluting it with water. When the solution is cooled the product crystallizes therefrom and can be recovered by filtration. The 5-hydroxy-8-methoxy-tetralone-1 is very sparingly soluble in benzene or ether and extremely soluble in methanol. It is conveniently purified by recrystallization from aqueous methanol.

The Grignard reaction between the 5-hydroxy-8-methoxy-tetralone-1 and methyl magnesium iodide is carried out utilizing, as a solvent for the reaction, a mixture of diethyl ether and pyridine. It is essential that the Grignard reaction be conducted in a solvent comprising pyridine in view of the fact that the tetralone is nearly insoluble in conventional solvents employed in Grignard reactions such as ether, benzene and dioxane. Moreover, it was found that the order of addition of the reactants is critical. For example, when a pyridine solution of the 5-hydroxy-8-methoxy-tetralone-1 was added to an ether solution of methyl magnesium iodide, it was found that considerable amounts (30–40%) of unreacted tetralone are recovered from the reaction solution and that considerable demethylation occurs. The reaction is best carried out by adding slowly a diethyl ether solution containing an excess (5 moles) of methyl magnesium iodide to a pyridine solution containing 1 molecular equivalent of 5-hydroxy-8-methoxy-tetralone-1. During the addition of the ethereal solution of the Grignard reagent to the pyridine solution of the tetralone, the reaction mixture is kept cool and additional ether is added to facilitate stirring since very little material is in solution at any time during the reaction, the reaction mixture being more of a suspension than a solution. Pyridine appears to be essential to this Grignard reaction because of its ability to dissolve both the tetralone starting material as well as the initially-formed complex of 5-hydroxy-8-methoxy-tetralone-1 with the Grignard reagent.

The mixture of the reactants is then stirred at room temperature for approximately 18 hours to insure completion of the reaction and the Grignard complex is decomposed by pouring the reaction solution into a mixture of ice and mineral acid. The resulting 1,5-dihydroxy-4-methoxy-5-methyl-5,6,7,8-tetrahydronaphthalene thus formed is extracted from the aqueous acid mixture by means of an organic solvent such as ether. The evaporation of the ether and distillation of the residual material in vacuo results in the dehydration of the tertiary alcohol intermediate to form the corresponding olefin, 1-hydroxy-4-methoxy-5-methyl-7,8-dihydronaphthalene (compound 5). This product can be further purified if desired by recrystallization from an organic solvent such as hexane.

The reaction between 1-hydroxy-4-methoxy-5-methyl-7,8-dihydronaphthalene and osmium tetroxide is conveniently carried out by adding osmium tetroxide to a solution of the dihydronaphthalene compound in an anhydrous organic solvent, such as anhydrous diethyl ether or benzene, whereupon immediate separation of the intermediate 5,6-osmic ester of 1,5,6-trihydroxy-4-methoxy-5-methyl-5,6,7,8-tetrahydronaphthalene occurs. The reaction mixture is then allowed to stand at room temperature, preferably for a period of approximately 7 to 8 hours, at which time the separation of the osmic ester is substantially complete. Although the reaction mixture may be treated without purification to accomplish hydrolysis of the osmate ester, it is preferable to collect the intermediate osmate ester on a filter and to thoroughly wash it with an organic solvent such as diethyl ether to remove impurities. The purified 5,6-osmate ester of 1,5,6-trihydroxy-4-methoxy-5-methyl-5,6,7,8-tetrahydronaphthalene is then hydrolyzed by heating with an aqueous hydrochloric acid solution or an aqueous solution of sodium sulfite to produce an aqueous reaction mixture containing 1,5,6-trihydroxy-4-methoxy-5-methyl-5,6,7,8-tetrahydronaphthalene (compound 6). This compound is conveniently recovered from the reaction mixture by filtering thereby removing the precipitate of reduced osmium compounds and undissolved sodium sulfite, evaporating the aqueous solution to approximately ½ its volume, adjusting the solution to neutrality by the addition of mineral acid, and extracting the product from the neutral aqeuous solution utilizing an organic solvent such as diethyl ether. Upon evaporation of the combined ether extracts there is obtained substantially pure 1,5,6 - trihydroxy - 4 - methoxy - 5 - methyl - 5,6,7,8 - tetrahydronaphthalene, which can be further purified, if desired, by recrystallization from a mixture of chloroform and petroleum ether.

The conversion of the 1,5,6 - trihydroxy - 4 - methoxy - 5 - methyl - 5,6,7,8 - tetrahydronaphthalene to 5 - hydroxy - 8 - methoxy - 1 - methyl - tertalone - 2 (compound 7) is accomplished by heating said 1,5,6 - trihydroxy - 4 - methoxy - 5 - methyl - 5,6,7,8 - tetrahydronaphthalene with an aqueous mineral acid solution, preferably with an aqeuous ethanolic solution of sulfuric acid. When the preferred reaction conditions, wherein the 1,5,6 - trihydroxy - 4 - methoxy - 5 - methyl - 5,6,7,8 - tetrahydronaphthalene is suspended in an aqueous ethanolic solution of sulfuric acid are utilized, it has been found that the conversion can be effected by heating the mixture under reflux for a period of about 1½ hours. When such a reaction solution is cooled the desired product crystallizes therefrom and can be recovered by filtration to produce a substantially quantitative yield of said 5 - hydroxy - 8 - methoxy - 1 - methyl - tetralone - 2. If desired, this compound can be readily purified by recrystallization from 50% aqueous alcohol.

The reaction between the 5 - hydroxy - 8 - methoxy - 1 - methyl - tetralone - 2 and the diethylamino butanone - 2-methiodide is carried out in an anhydrous organic solvent solution containing an alkaline condensing agent. Suitable alkaline condensing agents are alkali metal alkoxides, such as potassium methoxide, potassium ethoxide, sodium methoxide, sodium ethoxide, and alkali metal amides, such as sodium amide, potassium amide, and the like. When alkali metal alkoxides are used, the organic solvent used as a reaction medium is a lower aliphatic alcohol, such as methanol, ethanol, and the like; when alkali metal amides are used, the organic solvent employed is benzene, toluene, or xylene.

The diethylamino-butanone-2-methiodide is conveniently prepared by adding methyl iodide to diethylaminobutanone-2 while subjecting the reaction mixture to cooling, whereby the desired diethylamino-butanone-2-methiodide is produced in crystalline form. A solution of 5 - hydroxy - 8 - methoxy - 1 -methyl - tetralone - 2 in the solvent selected for the reaction is then added to the diethylamino-butanone-2-methiodide, followed by a solution of the alkaline condensing agent in the reaction solvent. The mixture is allowed to stand at a temperature of 0–5 C. for approximately one and one-half hours. and is then heated under refluex for an additional period of approximately one-half hour.

The 1 - hydroxy - 4 - methoxy - 7 - keto - 13 - methyl - 5,6,7,9,10,13 - hexahydrophenanthrene thus formed is recovered from the reaction mixture by acidifying said mixture with an excess of mineral acid and extracting the acidified aqueous solution with an organic solvent such as ether. The product contained in the ether solution is then transferred back to the aqueous phase by extracting the ether solution with an aqueous alkaline solution, preferably 2.5 N aqueous sodium hydroxide. Upon acidification of the alkaline extract, the desired product separates as an oil which can be crystallized from an aqeuous alcoholic solution to produce substantially pure 1 - hydroxy - 4 - methoxy - 7 - keto - 13 - methyl - 5,6,7,9,10,13 - hexahydrophenanthrene (compound 8).

The latter compound can be converted to 1-keto-4-methoxy - 7 - hydroxy - 13 - methylperhydrophenanthrene as follows: The 1 - hydroxy - 4 - methoxy - 7 - keto - 13- methyl - 5,6,7,9,10,13 - hexahydrophenanthrene is reduced in the presence of a catalyst to form 1,7-dihydroxy-4-methoxy - 13 - methyl - 5,6,7,8,9,10,13,14 - octahydrophenanthrene, which compound is then treated with acetic anhydride in the presence of acetic acid in order to convert it into 1 - hydroxy - 4 - methoxy - 7 - acetoxy - 13-methyl - 5,6,7,8,9,10,13,14 - octahydrophenanthrene. This latter compound is hydrogenated in methylcyclohexane solution in the presence of palladium-strontium carbonate catalyst thereby forming 1 - hydroxy - 4 - methoxy - 7 - acetoxy - 13 - methylperhydrophenanthrene which is oxidized to form 1 - keto - 4 - methoxy - 7 - acetoxy - 13-methylperhydrophenanthrene, and the latter treated with alcoholic potassium hydroxide to produce 1 - keto - 4-methoxy - 7 - hydroxy - 13 - methylperhydrophenanthrene. This latter compound, in addition to being useful in the total synthesis of steroids, can be treated with methylamine and the reaction product reduced by known methods to form 1 - (N - methylamino) - 4 - methoxy - 7-hydroxy - 13 - methylperhydrophenanthrene, which compound possesses antitussive activity.

The following examples illustrate methods of carrying out the present invention, but it is to be understood that these examples are given for purposes of illustration and not of limitation.

*Example 1*

320 gms. (2.32 moles) of hydroquinone dimethyl ether, 240 gms. (2.40 moles) of succinic anhydride and 2 liters of nitrobenzene were placed in a 5 liter round-bottomed flask, and the mixture was cooled to 10° C. 640 gms. (4.81 moles) of anhydrous aluminum chloride were added to the cooled mixture in small portions over a period of about 1 hour. During the addition of the aluminum chloride the contents of the flask were stirred vigorously and the flask and its contents were cooled by immersion in an ice bath. At no time was the temperature of the reaction mixture allowed to rise above 35° C. After the addition of the aluminum chloride was complete, the resulting solution was warmed slowly to 60° C., and this temperature was maintained with stirring for approximately 3 hours. The reaction solution was then cooled to 35° C., and the resulting dark viscous solution was poured onto a mixture of 400 ml. of concentrated hydrochloric acid and 700 g. of ice. The nitrobenzene was removed from the resulting aqueous mixture by steam distillation, and the residue was then cooled to 10° C., whereupon crude β - (2 - hydroxy - 5 - methoxybenzoyl) - propionic acid crystallized from the mixture. The crystalline material was recovered by filtration utilizing a suction filter. The product was sucked as dry as possible on the filter, was dissolved in 6 liters of benzene and the benzene solution was then heated under reflux for approximately 2 hours. The benzene solution of the product was decanted and cooled to 5° C. to aid crystallization, whereupon the product crystallized as green prisms which were recovered by filtration and dried to give 335 gms. of partially-purified β - (2 - hydroxy - 5 - methoxy - benzoyl)-propionic acid; M. P. 128–135° C.; yield approximately 62% of theory. This material was further purified by recrystallization from a 50–50 mixture of methanol and water (including treatment of the methanolic solution thereof with activated charcoal (Darco)) to afford 275 gms. of substantially pure β - (2 - hydroxy - 5 - methoxybenzoyl)-propionic acid; M. P. 137–142° C.; yield approximately 51% of theory. The β - (2 - hydroxy - 5 - methoxy-benzoyl)-propionic acid thus obtained was soluble in dilute sodium carbonate solution and is reprecipitated unchanged from this solution by the addition of acid thereto. It gives a positive ferric chloride test (blue green).

*Example 2*

A mixture of 400 gms. (1.8 moles) of β - (2 - hydroxy-5 - methoxybenzoyl) - propionic acid, 1 liter of 1.8 N aqueous potassium hydroxide and 50 gms. of copper chromium oxide was heated and shaken in contact with hydrogen at a pressure of 3500 p. s. i. (pounds per square inch). The hydrogenation was carried out for a period of 2 hours while maintaining the temperature of the reactants at 160° C. The temperature of the reaction mixture was then raised to 180° C. and the mixture was maintained at that temperature for a period of several hours time while continuing the shaking of the mixture under a hydrogenation pressure of 3500 p. s. i. The reaction mixture was then filtered to remove the catalyst, the filtrate was acidified with aqueous hydrochloric acid to a pH of 2, and the resulting mixture was then extracted with ether. The ether extract was washed with a saturated aqueous solution of sodium chloride and dried over sodium sulfate. The dried ether solution was then evaporated to produce a residual oil, and this oil was subjected to vacuum distillation to give 270 gms. of gamma-(2-hydroxy - 5 - methoxyphenyl) - butyric acid which was obtained in the form of a heavy oil; B. P. 170–178° C./0.1 mm. Yield: 71% of theory. This product, as obtained by distillation, is sufficiently pure to use directly for the preparation of 5-hydroxy-8-methoxy-tetralone-1 as described in Example 3 hereinbelow.

This oil can be further purified if desired by crystallization from petroleum ether (B. P. 60–80° C.). A sample of this oil was recrystallized several times from petroleum ether to give white prisms of substantially pure gamma-(2-hydroxy-5-methoxyphenyl)-butyric acid; M. P. 68–69°.

Example 3

260 gms. (1.24 moles) of gamma-(2-hydroxy-5-methoxyphenyl)-butyric acid were dissolved in 300 ml. of water containing 940 ml. of concentrated sulfuric acid, and the resulting solution was heated at 98° C. for a period of approximately 1 hour. The dark reaction solution was poured into 8 liters of ice water, and the mixture was cooled to 0° C. and allowed to stand at that temperature for a period of approximately 15 hours. The tan crystalline product which precipitated was recovered by filtration, washed thoroughly with cold water, and dissolved in an aqueous methanol solution containing 700 ml. of methanol and 2 liters of water. This methanolic solution was then treated with activated charcoal (Darco G–60), filtered hot, and the filtrate allowed to cool, whereupon the product crystallized in the form of yellow platelets which were recovered by filtration and dried to produce 200 gms. of 5-hydroxy-8-methoxytetralone-1; M. P. 155–160° C.; yield approximately 82% of theory. This material was further purified by recrystallization from aqueous methanol to give 170 gms. of substantially pure 5-hydroxy-8-methoxy-tetralone-1 which was obtained in the form of light yellow plates; M. P. 167–170° C.; yield approximately 68% of theory. Analysis.—Calc'd for $C_{11}H_{12}O_3$: C, 68.74; H, 6.29. Found: C, 68.67; H, 5.99.

Example 4

78 ml. (1.25 moles) of methyl iodide was slowly added, with stirring, to 30 gms. (1.25 moles) of magnesium, suspended in 300 ml. of dry ether, to produce an ethereal solution of methyl magnesium iodide. 300 ml of this solution was added to a cold solution of 48 gms. (0.25 mole) of 5-hydroxy-8-methoxytetralone-1 in 400 ml. of dry pyridine. After the addition of the methyl magnesium iodide solution was completed, 750 ml. of dry ether was added to the reaction mixture to facilitate stirring of the solid Grignard complex. The resulting mixture was stirred at room temperature for approximately 18 hours, and the complex was then decomposed by pouring the etheral reaction mixture into a mixture of ice and 500 ml. of aqueous hydrochloric acid. The resulting aqueous mixture was then saturated with sodium chloride and the aqueous phase was extracted four times with ether. The combined ether extracts were washed with aqueous sodium carbonate solution, then with water and dried over anhydrous sodium sulfate. The dried ether solution was evaporated to give 38 gms. of crystalline solid which was subjected to vacuum distillation at a temperature of 115–130° C. at a pressure of less than 0.1 mm. to give 34 gms. of 1-hydroxy-4-methoxy-5-methyl-7,8-dihydronaphthalene which was obtained in the form of a crystalline solid; M. P. 80–84° C.; yield approximately 72% of theory. This product was recrystallized from hexane (B. P. 90–100° C.) to produce 32 gms. of substantially pure 1 - hydroxy - 4 - methoxy - 5 - methyl - 7,8 - dihydronaphthalene; M. P. 85–86° C. Analysis.—Calc'd for $C_{12}H_{14}O_2$: C, 75.76; H, 7.42; $CH_3O$—, 16.3. Found: C, 75.68; H, 7.22; $CH_3O$—, 15.17.

Example 5

A solution of 7.266 gms. (0.0286 mole) of osmium tetraoxide in 100 ml. of dry diethyl ether was added to a solution of 4.9 gms. (0.0257 mole) of 1-hydroxy-4-methoxy-5-methyl-7,8-dihydronaphthalene in 50 ml. of dry diethyl ether. An immediate separation of the dark brown osmic ester of 1,5,6-trihydroxy-4-methoxy-5-methyl-5,6,7,8-tetrahydronaphthalene occurred along with a definite evolution of heat. The mixture was allowed to stand at room temperature for a period of approximately 18 hours, and the solid osmic ester of 1,5,6-trihydroxy-4-methoxy-5-methyl-5,6,7,8-tetrahydronaphthalene was then recovered from the mixture by filtration. The osmic ester was then dissolved in 250 ml. of ethanol, a solution of 29 gms. of sodium sulfite in 250 ml. of water was added to the ethanolic solution, and the resulting mixture was heated under reflux for a period of approximately two hours. The precipitate of reduced osmium compound together with undissolved sodium sulfite was separated from the reaction mixture by filtration through diatomaceous silica (Supercel). The filter cake was washed with several portions of hot ethanol and hot water and the combined filtrates were evaporated in vacuo to a volume of about 250 ml. The residual solution was made neutral (pH 7) by the addition of 2.5 N hydrochloric acid, and the resulting aqueous solution was extracted with five portions of diethyl ether. The ether extracts were combined and the resulting ether solution was partially dried with anhydrous sodium sulfate. The ether solution was then evaporated in vacuum to produce a crystalline residue which was then recrystallized from 20 ml. of chloroform by the addition thereto of 5 ml. of petroleum ether; (B. P. 30–60° C.) thereby giving 4 gms. of partially purified 1,5,6 - trihydroxy - 4 - methoxy - 5 - methyl - 5,6,7,8-tetrahydronaphthalene; M. P. 133–135° C.; yield approximately 64% of theory.

A sample of this material was further purified by crystallization from chloroform by the addition of petroleum ether to give substantially pure 1,5,6-trihydroxy-4-methoxy-5-methyl 5,6,7,8-tetrahydronaphthalene; M. P. 147–148° C., with softening at 135° C. Analysis.—Calc'd for $C_{12}H_{16}O_4$: C, 64.27; H, 7.19; $CH_3O$—, 13.84. Found: C, 64.53; H, 6.91; $CH_3O$—, 14.48.

Example 6

0.2 gm. of 1,5,6-trihydroxy-4-methoxy-5-methyl-5,6,7,8-tetrahydronaphthalene (M. P. 135–136° C.) was suspended in 1 ml. of water and 1 ml. of ethanol containing 8 drops of concentrated sulfuric acid. The resulting mixture was heated under reflux for 1½ hours. 1 ml. of water was added to the reaction solution and the resulting mixture was cooled in an ice bath. The crystalline product which separated was recovered by filtration and dried to give a substantially quantitative yield of 5-hydroxy-8-methoxy-1-methyl-tetralone-2; M. P. 136–138° C. (a mixed M. P. of this product with the starting material [M. P. 135–136° C.] was 100–120° C.). The initial product was further purified by several recrystallizations from alcohol and water thereby forming substantially pure 5-hydroxy-8-methoxy-1-methyl-tetralone-2, which was obtained in the form of white needles melting at 139–140° C. Analysis.—Calc'd for $C_{12}H_{14}O_3$: C, 69.88; H, 6.84; $CH_3O$—, 15.03. Found: C, 69.64; H, 6.74; $CH_3O$—, 14.92. An infra-red spectrum showed the presence of a carbonyl group.

Example 7

715 mgs. (0.005 mole) of diethylaminobutanone-2 was swirled in a small flask and cooled in ice while adding thereto 710 mg. (0.005 mole) of methyl iodide. The crystalline diethylamino-butanone-2-methiodide formed on the walls of the flask. When no more liquid remained, the flask was kept in ice for 30 minutes and was then placed on a water bath for a period of approximately 45 minutes. A solution of 1 gm. (0.005 mole) of 5-hydroxy-8-methoxy-1-methyltetralone-2 in 10 ml. of dry ethanol was added to the flask containing the methiodide. Dry nitrogen was introduced into the flask to expel the air, and a solution of potassium ethylate (prepared by reacting 432 mg. (0.01 mole) of potassium with 10 ml. of dry ethanol) was then added to the mixture contained in the flask. The contents of the flask were then swirled and cooled for a period of 30 minutes and the flask was then immersed in an ice bath for a period of 1 hour. The reaction solution in the flask was then boiled gently for a period of 25 minutes, and an excess of 2 N sulfuric acid was then added to the reaction solution. The acidified aqueous reaction mixture was extracted with ether and the resulting ether extract was extracted with an aqueous solution of 2.5 N aqueous sodium hydroxide. The aqueous alkaline extract was then acidified, whereupon 1 gm. of an oil separated. This oil was dissolved in an aqueous methanol solution, the solution was treated with activated charcoal (Darco G-60) and filtered, and the filtrate was allowed to stand whereupon the product crystallized and was recovered by filtration. The solid crystalline product was sublimed and was then recrystallized twice from methanol to produce substantially pure 1-hydroxy-4-methoxy - 7 - keto - 13 - methyl - 5,6,7,9,10,13 - hexahydrophenanthrene which was obtained in the form of pale yellow prisms; M. P. 178–180° C. *Analysis.—* Calc'd for $C_{16}H_{18}O_3$: C, 74.39; H, 7.02; $CH_3O$—, 12.01. Found: C, 73.85; H, 7.01; $CH_3O$—, 12.83.

Various changes and modifications may be made in carrying out the present invention without departing from the spirit and scope thereof. Insofar as these changes and modifications are within the purview of the annexed claims, they are to be considered as part of my invention.

I claim:

1. The process of preparing 1-hydroxy-4-methoxy-7-keto - 13 - methyl - 5,6,7,9,10,13 - hexahydrophenanthrene which comprises reacting hydroquinone dimethyl ether with succinic anhydride in the presence of aluminum chloride, intimately contacting the reaction mixture with an aqueous acid solution and reducing the resulting β-(2-hydroxy-5-methoxy-benzoyl)-propionic acid to produce gamma-(2-hydroxy-5-methoxy-phenyl)-butyric acid, heating the latter compound with an aqueous solution of sulfuric acid to form 5-hydroxy-8-methoxy-tetralone-1, reacting said 5-hydroxy-8-methoxy-tetralone-1 with methyl magnesium iodide followed by hydrolysis of the Grignard intermediate thus obtained to form 1-hydroxy-4-methoxy-5-methyl-7,8-dihydronaphthalene, reacting the latter compound with osmium tetroxide in organic solvent solution and hydrolyzing the intermediate osmate ester thus formed to produce 1,5,6-trihydroxy-4-methoxy-5-methyl-5,6,7,8-tetrahydronaphthalene, heating this compound with an aqueous mineral acid solution to form 5-hydroxy-8-methoxy-1-methyl-tetralone-2, and reacting said 5-hydroxy-8-methoxy-1-methyl-tetralone-2 with diethylaminobutanone-2-methiodide in the presence of an alkaline condensing agent.

2. The process of preparing 1-hydroxy-4-methoxy-7-keto - 13 - methyl - 5,6,7,9,10,13 - hexahydrophenanthrene which comprises reacting 5-hydroxy-8-methoxy-1-methyl-tetralone-2 with diethylaminobutanone-2 methiodide, said reaction being carried out by heating the reactants together in an anhydrous organic solvent solution in the presence of an alkaline condensing agent.

3. The process of preparing 1-hydroxy-4-methoxy-7-keto - 13 - methyl - 5,6,7,9,10,13 - hexahydrophenanthrene which comprises reacting 5-hydroxy-8-methoxy-1-methyl-tetralone-2 with diethylaminobutanone-2-methiodide, said reaction being carried out by heating the reactants together in the presence of a substantially anhydrous ethanolic solution of potassium ethoxide.

4. 1-hydroxy - 4 - methoxy - 7 - keto - 13 - methyl-5,6,7,9,10,13-hexadrophenanthrene.

No references cited.